United States Patent

[15] 3,683,418

[45] Aug. 8, 1972

Martin

[54] METHOD OF PROTECTING DATA IN A MULTIPROCESSOR COMPUTER SYSTEM

[72] Inventor: Robert Lanham Martin, Brookside, N.J.

[73] Assignee: Bell Telephone Laboratories, Incorporated, Murray Hill, Berkeley Heights, N.J.

[22] Filed: April 16, 1970

[21] Appl. No.: 29,094

[52] U.S. Cl. ....................................444/1, 340/172.5
[51] Int. Cl. .............................G06f 9/18, G06f 15/16
[58] Field of Search ........................340/172.5; 444/1

[56] References Cited

UNITED STATES PATENTS

| | | | |
|---|---|---|---|
| 3,407,387 | 10/1968 | Looschen et al. | 340/172.5 X |
| 3,445,819 | 5/1969 | Cooper et al. | 340/172.5 |
| 3,469,239 | 9/1969 | Richmond et al. | 340/172.5 |
| 3,528,062 | 9/1970 | Lehman et al. | 340/172.5 |
| 3,530,438 | 9/1970 | Mellen et al. | 340/172.5 |
| 3,328,768 | 6/1967 | Amdahl et al. | 340/172.5 |
| 3,398,405 | 8/1968 | Carlson et al. | 340/172.5 |
| 3,405,394 | 10/1968 | Diral | 340/172.5 |
| 3,562,717 | 2/1971 | Harmon et al. | 340/172.5 |
| 3,573,736 | 4/1971 | Schlaeppi | 340/172.5 |

*Primary Examiner*—Paul J. Henon
*Assistant Examiner*—Melvin B. Chapnick
*Attorney*—R. J. Guenther and William L. Keefauver

[57] ABSTRACT

A machine process that performs the function of assigning particular tasks to individual processors in a multiprocessor computer system so as to prevent undesired simultaneous access of stored data by two or more processors. The machine process read-locks all blocks of data that will be read by a task and write-locks all blocks of data that will be written into by a task immediately preceding the execution of that task. All blocks of data that were locked before a task was executed and not unlocked by the task during its execution, are unlocked upon its completion.

7 Claims, 7 Drawing Figures

DATA SET LOCK TABLE
(1/ DATA SET)

TASK LOCK LIST
(1/TASK WHICH LOCKS A DATA SET)

INVENTOR
R. L. MARTIN
BY R.O. Nimz
ATTORNEY

FLOW CHART FOR LCKONE

FLOW CHART FOR UNLALL

FLOW CHART FOR UNLONE

FLOW CHART FOR UNLONE

METHOD OF PROTECTING DATA IN A MULTIPROCESSOR COMPUTER SYSTEM

GOVERNMENT CONTRACT

The invention herein claimed was made in the course of or under contract with the Department of the Army.

BACKGROUND OF THE INVENTION

1. Field of the Invention

This invention relates to multiprocessor computing systems and more particularly to a method of protecting data in such systems.

2. Description of the Prior Art

Multiprocessor computing systems are increasingly being used in the solution of complex problems, particularly problems requiring real time computation and response. The availability of more than one processor in a computing system allows a plurality of programs to be running simultaneously. This permits both parallel and serial processing. Parallel processing allows a plurality of separate functions to be performed simultaneously. Serial processing involves the separation of a single function into discrete parts, termed "tasks," which may be simultaneously performed.

The most general hardware configuration for performing these two types of processing is one in which each processor can access any memory unit in the system. This allows maximum interaction between processors and tends to increase the operational capability of the system. Unfortunately, this maximum interaction can also have disastrous consequences. Most real time functions cannot reasonably be broken down into independent tasks. This means that there is likely to be considerable interaction between tasks, since, for example, several tasks often use the same "blocks of data" or "data sets", where the terms "block of data" and "data set" are understood to mean contiguous or noncontiguous sequences of stored data words having some logical nexus. A problem may arise when a data set is simultaneously accessed by two or more tasks. To illustrate, a data set might be used as a queue containing a list of tasks which are to be sequentially performed. If two processors simultaneously access this queue for a new task, then both might pick up the same task. Conversely, if both simultaneously add an entry to the queue, one would destroy the other's entry. Confusion can also arise in cases where data sets are being used to store computation results since it is possible for one task to be reading a data set while another is updating it.

Prior art solutions to these problems involve the use of program "locks." These "locks" comprise particular bits contained in a particular word in each data set. The lock word of each data set must be checked by a task before it accesses the data set. A particular bit pattern, for example all zeros, in the lock word indicates that the data set is currently not being accessed. A second bit pattern, for example all ones, indicates that data is currently being written into or read out of the data set by another task.

This simplified use of lock words is not a complete solution to the problems of improper task interaction in a multiprocessor environment. It is possible that in the time it takes a processor to check a lock word, discover that it is all zeros, and set it to all ones, one or more other processors may also check the lock word and find that it is all zeros because the first processor has not yet set the lock. When this occurs several processors will be simultaneously accessing the data set, each believing it has sole control.

To obviate this problem special instructions for testing lock words have been developed. These instructions, for example, may take the form disclosed in the copending United States patent application Ser. No. 836,242, filed on June 25, 1969 by W. M. Artz, et al. and assigned to the assignee of the present invention. These special instructions fall into two categories, fetching al., and storing instructions.

A special fetching instruction suitable for data locking purposes is the fetch-and-bias-negative (FBN) command. When a processor interprets the FBN it sends a fetch biased instruction to the appropriate memory module. The memory module, in one cycle, fetches the word from the addressed location, biases the word by OR'ing ones into the lock bits of the word, and restores the possibly modified word in memory. The word as it was before modification is sent to the processor. The task must then test the lock bits of the word received. If the lock bits are all ones, this indicates, in the absence of an error, that another task is using the data set. If they are zero, this indicates, in the absence of an error, that no other task is using the data set. Even if the lock bits of the word received by the processor are zero, the data set is currently locked because the FBN instruction had automatically set the lock bits at the time the word was read. Since this automatic locking all takes place in a single memory cycle, it is impossible for two or more tasks to simultaneously lock a data set.

A special storing instruction suitable for data locking purposes is the biased-conditional-store (BCS) command. This works in a fashion similar to the FBN except that the storing only occurs if the locking bits of the target word are not set to one. A fetch instruction must be used after the BCS to insure that the storing occurred. The BCS command allows the programmer to deposit information in the lock word at the instant the data set is locked. This can be particularly advantageous if an interrupt occurs just as the data set is locked.

These two instructions provide an unambiguous means for locking data sets but, unfortunately, do not in themselves provide a complete solution for the problem of task interference. The most obvious difficulty is that the integrity of the locks depends entirely on their being strictly honored by programmers. The locks are in reality only indicators. They cannot actually prevent any task's ignoring the locking bits and accessing the data set.

Even if programmers do honor the lock bits, problems can still arise if data set locking is not controlled by a central source. For example, assume that task P1 locks data set D1 at time T1 and will attempt to lock data set D2 at some later time. If there exists a task P2 that locks data set D2 at time T1 and that will attempt to lock data set D1 at some later time, then a deadlock will eventually occur in which P1 will wait for D2 to be unlocked and P2 will wait for D1 to be unlocked. Not only will P1 and P2 be permanently suspended, but D1 and D2 will be permanently locked.

A data set could also be come permanently locked if a task did not unlock it. This could occur due to careless coding, failure to include unlocking statements in interrupt response code, or an unplanned task execution sequence caused by a hardware or program fault.

Task interference also raises the problem of what should be cone if a task finds a data set locked when it attempts to lock it. Does it wait and continue to attempt to lock the data set, does it go away and do something else and try again, or does it just give up and abort the current job?

Clearly, data set locking has many associated problems which cannot be solved by user agreement alone. It is equally clear that any solution to these problems must use a minimum of system resources and require as small an addition to the time taken by executive and monitoring procedures as possible.

Therefore, it is an object of the present invention to provide a process for insuring data set integrity in a multiprocessing environment.

It is a specific object of this invention to provide a process of data set protection that will not result in permanently locking any data set or permanently inhibiting any computational function.

It is a more specific object of this invention to provide a process of data set locking which is computationally efficient.

SUMMARY OF THE INVENTION

In accordance with the present invention, these objects are achieved through the use of a machine-implemented multiprocessor scheduling algorithm which performs the function of assigning particular tasks to individual processors. A task is not assigned to a processor for execution until all of the conditions precedent to its running have been satisfied. The scheduling algorithm uses each task's data set locking requirements as one type of condition precedent. All data sets that will be read by a task are read-locked and all data sets that it will write into are write-locked immediately preceding the execution of the task. "Read-locking" a data set allows any other program to read from the data set but not write into it. "Write-locking" a data set prevents any other program from either reading from or writing into it. The scheduling program is the only means available to a system user for locking an unlocking data sets in the system and it performs its function in accordance with a predetermined sequence of priorities, thereby eliminating the possibility of task interaction through data set locking.

DETAILED DESCRIPTION

Figure 1:
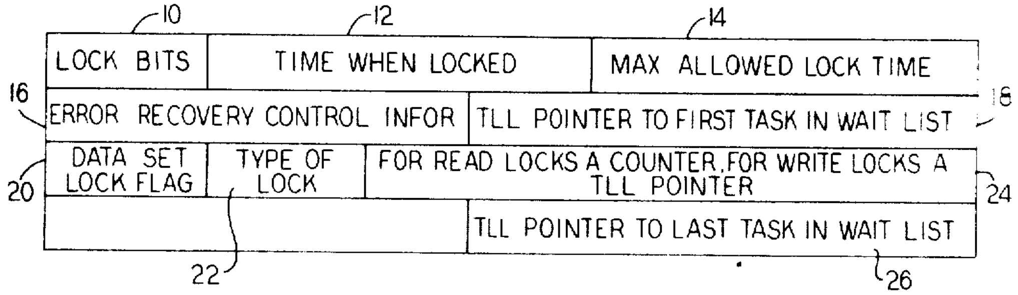
FIGS. 1 and 2 are graphical representations of the data sets used by the machine process of the present invention.

The scheduling algorithm of the present invention can be most advantageously used in a computing system of the type disclosed in U.S. Pat. No. 3,348,210 "Digital Computer Employing Plural Processors," granted to B. P. Ochsner on Oct. 17, 1967, and assigned to the assignee of the present invention. This type of computing system includes, inter alia, a plurality of processing units, special fetching and storing instructions suitable for data locking instructions, and apparatus for performing task assignment.

The task assignment apparatus includes a task assignment routine that utilizes task assignment words to sequentially assign tasks to particular processors in the order in which the processors finish their previous tasks. The task assignment words typically include a plurality of conditional enabling bits and an absolute enabling bit. When a given task requires as a condition precedent to its execution the processing of one or more other tasks, the task assignment word of the dependent task will include a conditional enabling bit which must be set by the task upon which it depends. Each task will thus have as many conditional enabling bits as it has tasks upon which it depends. Each of these conditional bits is initially set to a binary zero and is rewritten into a binary one by the task assignment routine in response to the functioning of the prior task. The task assignment routine checks the conditional enable bits of each task assignment word every time it sets a conditional enabling bit. When it finds a task assignment word having all of its conditional enabling bits set to a binary one, it sets the absolute enabling bit to a binary one. This condition indicates that the task associated with that particular task assignment word is available for processing the next time that a processor completes its assigned routine and returns control to the task assignment routine. When this occurs, the task assignment routine will sequentially search the absolute enabling bits of the task words, starting with the highest priority of such words, until a binary one is encountered. The task associated with the task assignment word thus located will then be executed by that processor.

The machine process of the present invention is most suitably embodied in a locking task that performs the locking function immediately after the execution of the task assignment routine. The absolute enabling of a task by the task assignment routine means that all of the tasks and I/O functions that are precedent to the execution of that task have been run. Performing the locking function for that task at this time rather than at a previous time assures that locks will be in force only during the actual execution of the task requiring them.

The locking process comprising this invention is described by the illustrative digital computer program listing shown on pages 19 through 23 of the Appendix A. It is understood that this program would have to be used in conjunction with a multiprocessor computing system containing a task assignment routine of the type discussed above. The program listing, written in ALGOL, is a description of the set of electrical control signals that would serve to reconfigure such a multiprocessor computing system into a novel system capable of performing the invention. The steps performed by this novel system on these electrical control signals comprise the best mode contemplated to carry out the invention.

Figure 2:
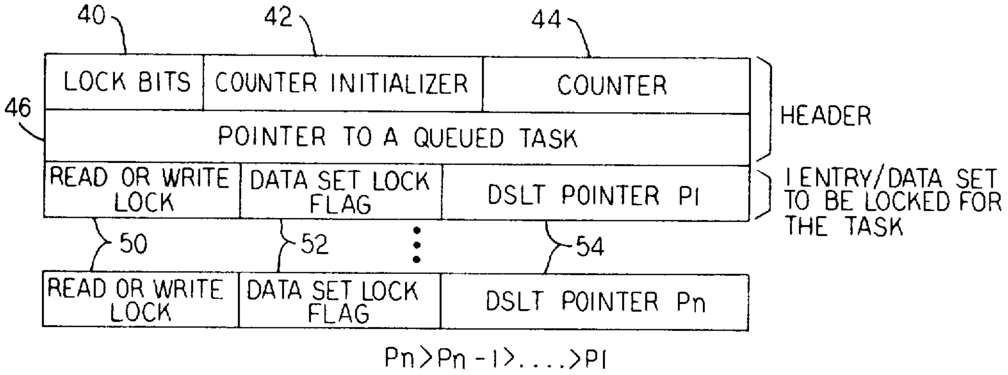

The program listing, which has been extensively commented, is more readily understood with the aid of the tables of FIGS. 1 and 2 and the flow charts of FIGS. 3 through 6B. The statement numbers of the program steps correspond generally to the numbers of the blocks in the flow charts. The flow charts can be seen to include four different symbols. The oval symbols, termed "terminal indicators," signify the beginning and end of a particular program sequence. The rectangles, termed "operation blocks," contain the description of a particular detailed operational step of the process. The diamond-shaped symbols, termed "conditional branch points," contain a description of a test performed by the computer to enable it to choose the next step to be performed. The circles are used merely as a drawing aid to avoid overlapping lines.

The program that implements the locking process of the present invention will be referred to hereinafter as the "Data Set Lock Manager" or DSLM. The DSLM uses the two types of data sets shown in FIGS. 1 and 2. The data sets represented graphically in FIGS. 1 and 2 comprise a plurality of digital words stored in memory. Each word is broken into a number of fields containing a plurality of bits. The manner in which these data sets are formatted is well-known to those skilled in the art.

The Data Set Lock Table (DSLT) shown in FIG. 1 contains all the information required to lock and unlock a particular data set. The DSLM must have one DSLT for each data set that is to be locked. The DSLT contains fields 10 and 20 which indicate whether the data set is locked; field 22 which indicates whether the data set is read-locked or write-locked; field 12 which contains the contents of the system clock at the time the data set was locked; fields 14 and 16 which contain control information for response to locking errors; field 24, which is a counter if field 22 indicates that the data set is read-locked, and which is a pointer to the Task Lock List if field 22 indicates that the data set is write-locked; and fields 18 and 26 which, respectively, contain pointers to the first and last Task Lock List entries corresponding to the lists of tasks waiting to lock the data set. The manner in which these various fields are used will be explained in greater detail in conjunction with the flow charts of FIGS. 3 through 6B.

The Task Lock List (TLL) shown in FIG. 2 contains the information required to lock all the data sets that a particular task requires to be locked. Each task that locks a data set must have an associated TLL. The TLL has a two word header and a word for each data set locked by the particular task. As shown in FIG. 2 the header includes: field 40, the lock bits; field 44, a counter that indicates the number of data sets the task still has to lock; field 42, the value used each time the counter of field 44 is initialized; and field 46, a pointer used if the task is queued on a data set. Each data set entry includes field 50, an indicator of whether a read or write lock is required; field 52, a flag indicating whether the task has a lock on the data set; and field 54, a pointer into the DSLT that tells the DSLM which particular data set to lock. It is important to note that each TLL must have the data words containing the DSLT pointers ordered in exactly the same fashion. This ordering obviates the previously discussed problem of tasks being permanently suspended and data sets being permanently locked. The exact manner in which the various TLL fields are used will be explained in greater detail in conjunction with the flow charts of FIGS. 3 through 6B.

The particular illustrative implementation of the machine process of the present invention that is shown in the flow charts of FIGS. 3 through 6B includes four programs: LCKALL, which locks all data sets for a task; LCKONE, which locks a particular data set; UNLALL, which unlocks all data sets for a particular task; and UNLONE, which unlocks a particular data set.

Figure 3:
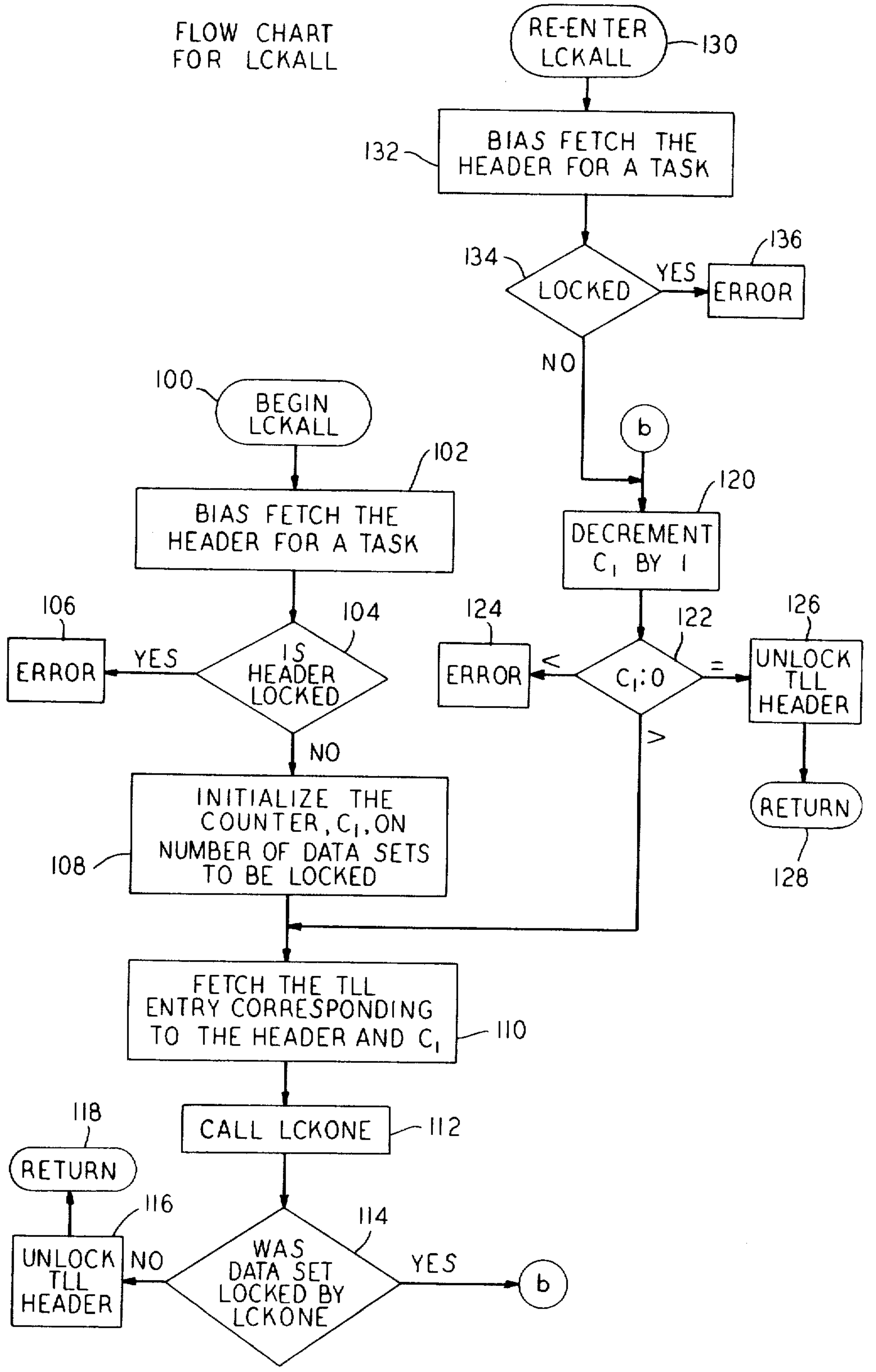
FIGS. 3, 4, 5, 6A and 6B are flow charts of the present machine algorithm.

LCKALL, shown in FIG. 3, is called by the task assignment routine when all the task precedents and I/O precedents for a particular task have been fulfilled. For ease of discussion the task currently being processed by DSLM will be termed the "enable task." Each time the task assignment routine calls LCKALL it passes to it a pointer into the TLL list. This pointer allows LCKALL to determine which data sets (termed the "target" data sets) the enabled task requires to be locked, as well as the type of lock to be put on each of the target data sets.

LCKALL is initially entered at terminal indicator 100. Operation block 102 uses the aforementioned fetch-and-bias negative instruction to access the first word of the header of the TLL associated with the enabled task. Conditional branch point 104 determines whether the lock bits of field 40 shown in FIG. 1 have been previously locked. If they have been, this indicates an error condition since only UNLALL should be accessing the header and UNLALL unlocks the header before returning to the task assignment routine at terminal 128. Thus if the header is locked when conditional branch point 104 is reached, control is transferred to a system error program as represented by block 106. The program represented by block 106 would use information such as that shown symbolically as field 16 of FIG. 1, to take action consonant with whatever error recovery procedures exist in the particular system utilizing the invention. For example, a system may simply reset all queues, tasks, and data sets whenever an error occurs. On the other hand, the system function may be of such a critical nature as to justify complicated procedures for determining the precise source of error in order to avoid a total system reset. Such procedures form no part of this invention and will not be discussed in further detail.

If the header is not locked, block 108 uses the contents of field 42, shown in FIG. 2, to initialize counter $C_1$, shown symbolically as field 44 in FIG. 2, which is used to keep track of the number of data sets to be locked. Block 110 then uses the contents of $C_1$ to fetch the contents of field 54, which comprise a pointer to the next data set to be locked. This pointer is passed to LCKONE and this program is called in block 112.

As will be explained in the description of FIG. 4, LCKONE will lock the data set if it is possible to do so. Thus when LCKONE returns control to LCKALL it is necessary to test, in conditional branch point 114, whether or not the particular data set was locked. If LCKONE was not able to lock the data set, it will have entered a pointer to the task on a wait queue, in the manner to be described, before returning to LCKALL. LCKALL then temporarily discontinues its attempt to lock the data sets for the enabled task. Operation block 116 unlocks the enabled task's TLL header and terminal 118 returns control to the calling program. If LCKONE was able to lock the data set conditional branch point 114 transfers control to operation block 120 where $C_1$ is decremented by one. Conditional branch point 122 next checks the status of counter $C_1$. If this counter is less than zero an error is indicated and control is transferred to block 124. If $C_1$ is still greater than zero, signifying that there remain data sets to be locked, control is transferred to block 110. If $C_1$ is equal to zero, indicating that all the data sets that the enabled task requires to be locked have been locked, control is transferred to block 126 which unlocks the enabled task's TLL header, and terminal indicator 128 returns control to the calling program.

If an exit is made from terminal 118 of LCKALL, signifying the inability of LCKONE to lock a particular one of the enabled task's target data sets, LCKALL will be called by UNLONE as soon as the enabled task entry next comes to the top of the wait queue. When called by UNLONE, LCKALL is entered at terminal 130 and operation block 132 bias-fetches the first word of the header of the TLL associated with the enabled task. If the header is locked, conditional branch point 134 transfers control to an error program represented by block 136. If the header is not locked, operation block 120 decrements counter $C_1$, and transfers control to conditional branch point 122. Conditional branch point 122 then attempts to lock the remaining target data sets in accordance with the above description.

Figure 4:
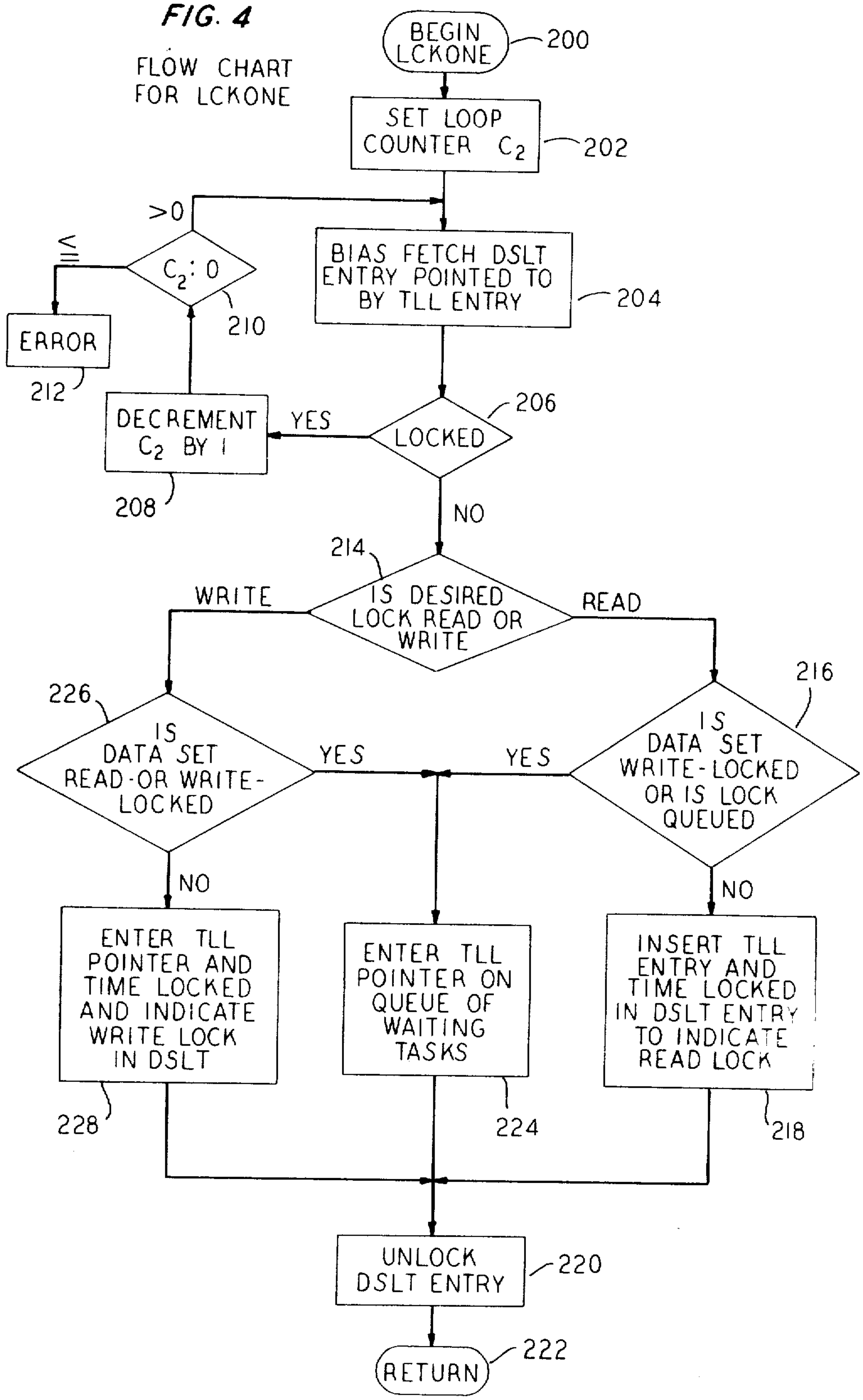

LCKONE, shown in FIG. 4, is entered at terminal indicator 200. Its first action, in block 202, is to set counter $c_2$. The purpose of counter $C_2$ is to allow loop 204–210, which serves to fetch the DSLT entry for the target data set, to be preformed a number of times before an error condition is reported in order to allow for the contingency that another task is currently accessing that DSLT entry. The value used to set loop counter $C_2$, represented symbolically as field 14 in FIG. 1, will be dependent upon system parameters, such as the number and execution times of the processor units, the memory cycle time, input-output interaction, and the general system structure, in a manner well-known to those skilled in the art. For most systems, setting $C_2$ to the value of 20 will provide a sufficient waiting period.

Operation block 204 bias-fetches the first word of the particular DSLT entry pointed to by the TLL entry which was passed to LCKONE when LCKONE was called. If the lock bits of this first word indicate that the DSLT entry is locked, conditional branch point 206 transfers control to block 208 where $C_2$ is decremented by one. Conditional branch point 210 then checks to see whether or not $C_2$ is zero and, if not, again passes control to block 204. If $C_2$ is zero, control is transferred to an error program represented by block 212.

If the lock bis of the first word (field 10 shown in FIG. 1) of the DSLT entry of the target data set are not locked, conditional branch point 206 transfers control to conditional branch point 214. Conditional branch point 214 utilizes field 50, shown in FIG. 2, of the TLL entry of the enabled task to determine whether a read-lock or a write-lock is desired. If a read-lock is desired, control is passed to conditional branch point 216. Conditional branch point 216 uses field 22 and 18, shown in FIG. 1, of the DSLT entry of the target data set to determine whether the data set is write-locked or is lock-queued. If neither of these conditions obtains, operation block 218 places the appropriate entries in fields 12, 20 and 22 of the target data set's DSLT entry and field 52 of the TLL entry to indicate a read lock. Operation block 220 then unlocks the DSLT entry by resetting the bits in field 10, shown in FIG. 1, and terminal 222 returns control to LCKALL.

If conditional branch point 216 determines that the target data set is either currently write-locked or lock-queued, block 224 used the contents of field 26, shown in FIG. 1, to place a TLL pointer, shown as field 46 in FIG. 2, to the appropriate task on the queue of waiting tasks. This TLL pointer, as explained hereinafter in conjunction with FIG. 6, will cause UNLONE to lock the target data set as desired by the enabled task as soon as the target data set becomes free. Block 220 then unlocks the DSLT entry by placing zeros in field 10, shown in FIG. 1, and terminal 222 returns control to LCKALL.

If conditional branch point 214 determines that a write-lock is desired, control is transferred to conditional branch point 226. Conditional branch point 226 uses field 10, shown in FIG. 1, of the target data set's DSLT entry to determine whether the data set is currently read-locked or write-locked. If the data set is locked, control is transferred to block 224 and this block proceeds in the manner previously explained. If the data set is not currently locked, control is transferred to block 228. This block fills fields 12, 20 and 22, shown in FIG. 1, of the target data set's DSLT entry as well as field 52, shown in FIG. 2, of the enabled task's TLL entry and transfers control to block 220 which unlocks the DSLT entry. Terminal 222 then returns control to LCKALL.

When the enabled task has completed its execution, the DSLM must unlock all the data sets that the task still has locked. All of the data sets originally locked for the task before it was executed may not still be locked since it is possible for a task to unlock a data set by calling UNLONE during its execution to unlock particular data sets. To perform the remaining unlocking, DSLM calls UNLALL and passes to it a pointer into the TLL of the enabled task.

Figure 5:
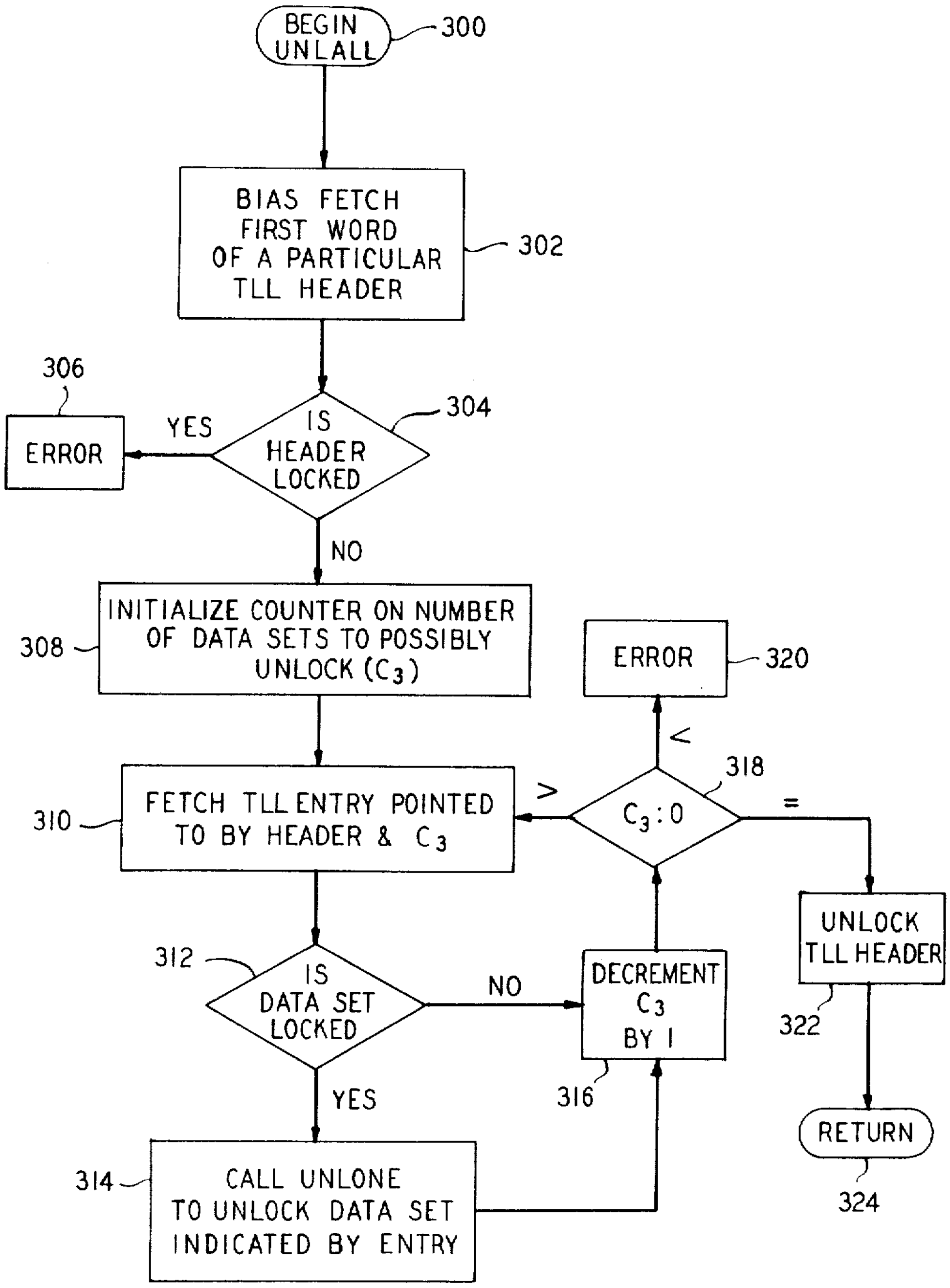

As shown in FIG. 5, UNLALL is entered at terminal 300. Block 302 bias-fetches the first word of the enabled task's TLL header. If field 40, shown in FIG. 2, of this header is locked, conditional branch point 304 transfers control to error program 306 in a manner analogous to conditional branch point 104 in LCKALL. If the header is not locked, control is transferred to block 308 where counter $C_3$ is initialized with the number of data sets to be unlocked. Block 310 then fetches the TLL entry pointed to by the header and $C_3$. Conditional branch point 312 uses the DSLT pointer of this TLL entry to reach the first data set and determine whether or not it is locked. If the data set is locked, lock 314 calls UNLONE to unlock it. If it is not locked, control is passed directly to operation block 316.

Thus the arrival at operation block 316 by either route indicates that the data set in question has been unlocked. $C_3$ is then decremented by one and conditional branch point 318 then tests the status of $C_3$. If it is less than zero, control is passed to an error program represented by block 320. If it is greater than zero, control is passed to block 310 and another iteration of loop 310–318 occurs. If it is equal to zero, operation block 322 unlocks the TLL header and terminal 324 returns control to the calling program.

Figure 6A:
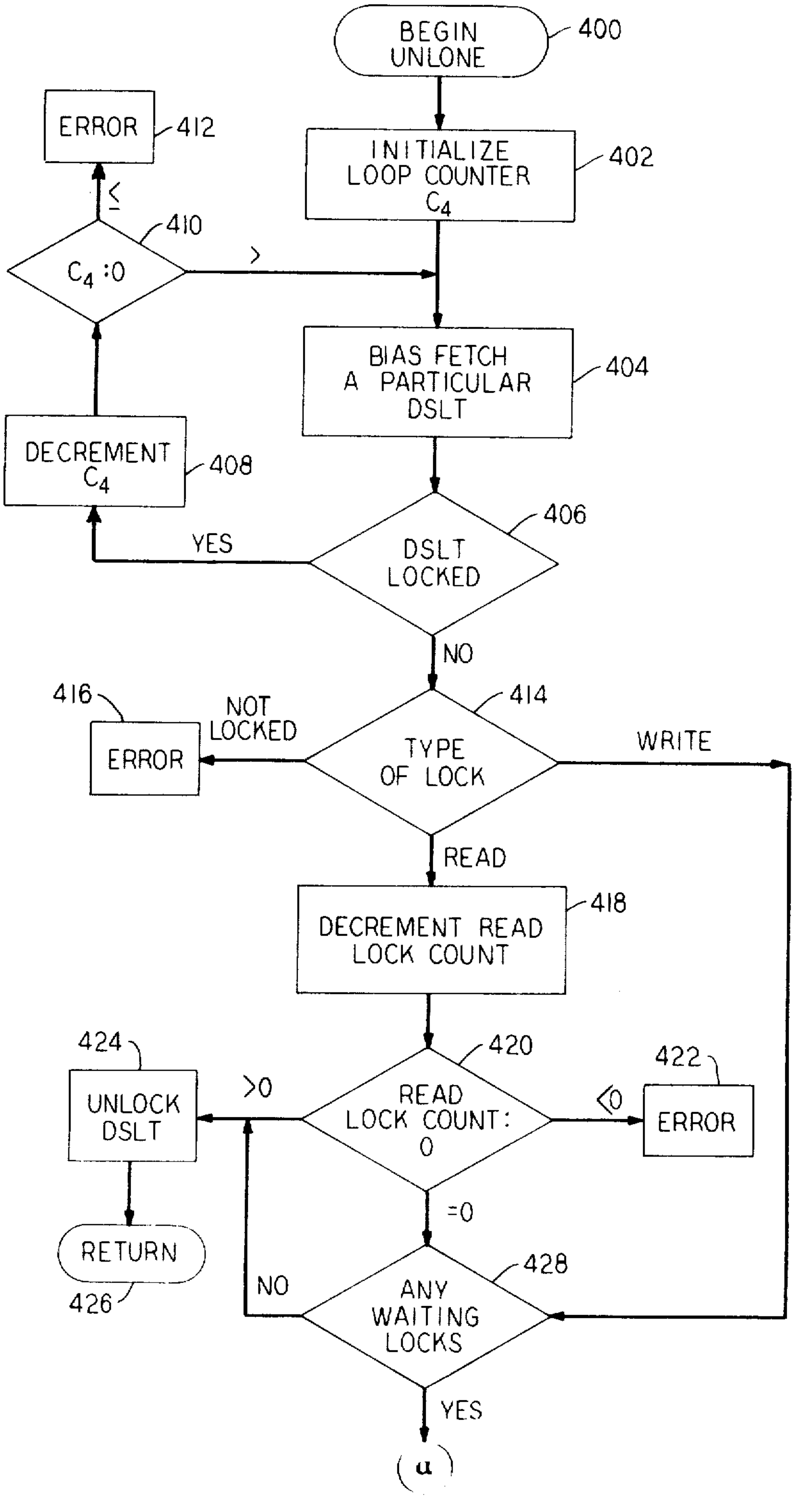
Figure 6B:
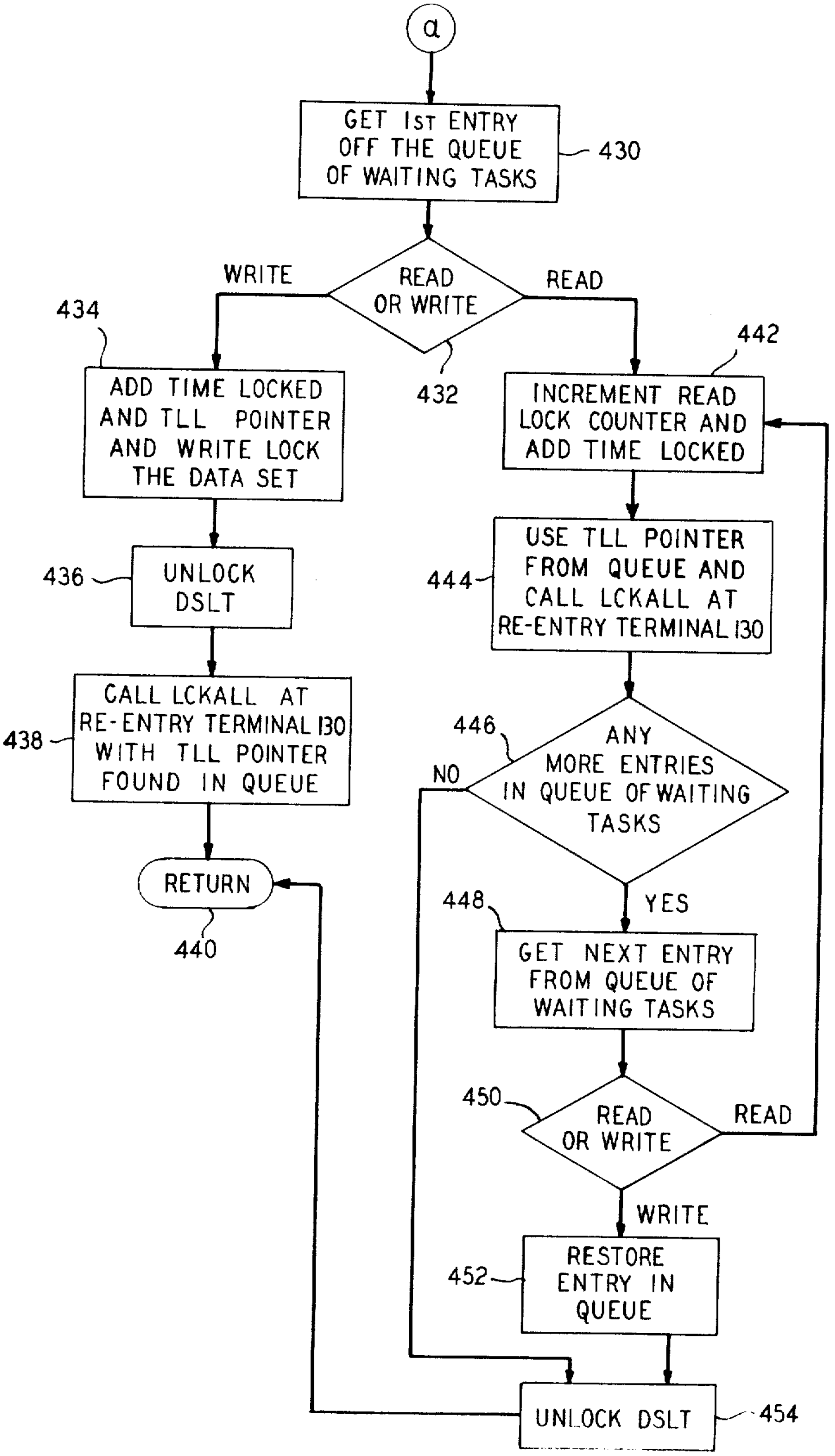

UNLONE, shown in FIGS. 6A and 6B, is entered at terminal indicator 400 as shown in FIG. 6A. Block 402, initializes counter $C_4$ in a manner analogous to the initialization of counter $C_2$ in block 202 in FIG. 4. Block 404 bias-fetches the DSLT entry for the target data set. Conditional branch point 406 checks field 10, shown in FIG. 1, of the target data set's DSLT entry to determine whether or not it is locked. If it is locked, block 408 decrements $C_4$ and conditional branch point 410 tests $C_4$. If it is less than or equal to zero, control is transferred to an error program represented by block 412. If it is greater than zero, control is again transferred to block 404. When conditional branch point 406 finds that the lock bits of the DSLT entry are not locked, control is transferred to conditional branch point 414 to determine the type of lock currently existing on the target data set. If the data set if found to be unlocked, control is transferred to an error program represented by block 416. If the data set is found to be write-locked, control is transferred immediately to conditional branch point 428. If the data set is read-locked, control is transferred to block 418 which decrements the read-lock counter, shown in field 24 of FIG. 1, and conditional branch point 420 tests the status of the read-lock counter. If it is less than zero, control is passed to an error program represented by block 422. If it is greater than zero, indicating that other tasks currently have a read-lock on the data set, block 424 unlocks field 10 and terminal 426 returns control to the calling program. If the read-lock count is equal to zero, conditional branch point 428 determines whether or not there are any enabled tasks waiting to lock the target data set. If not, control is transferred to block 424, and if so, control is transferred to block 430.

Block 430, shown in FIG. 6B, uses the pointer in field 18 of this DSLT entry as shown in FIG. 1 to get the first enabled task in the queue of waiting tasks. Conditional branch point 432 determines whether the queued task wants a read-lock or a write-lock on the target data set.

If a write-lock is desired, block 434 places the current value of the system clock in field 12, shown in FIG. 1 of the target data sets DSLT, updates the TLL pointer in field 18, sets a write-lock indication in field 22, and sets the lock bits in field 20. Block 436 then unlocks the DSLT by resetting field 10. Block 438 then calls LCKALL, passing to it the pointer shown in field 46 of FIG. 2, to the queued task and transferring control to terminal 130 shown in FIG. 3. LCKALL will than use the pointer to lock the remaining data sets of the queued task in the manner described in the previous discussion of FIG. 3. When LCKALL returns control to UNLONE, terminal indicator 440 returns control to UNLALL.

If conditional branch point 432 determines that the queued task requires a read-lock on the target data set, it transfers control to block 442. Block 442 increments field 24, shown in FIG 1, of the target data set's DSLT, and places the current value of the system clock in field 12. Block 444 then calls LCKALL in the same manner as block 438, described above. When LCKALL returns control, conditional branch point 446 uses field 46, shown in FIG. 2, to determine whether there are any more tasks waiting in the queue. If not, control is transferred to block 454; field 10, shown in FIG. 1, of the target data set's DSLT is unlocked; and terminal indicator 440 returns control to UNLALL.

If there are tasks remaining in the queue, block 448 uses the pointer shown in field 46 of FIG. 2 to fetch the next enabled task. If this new task desires to read-lock the target data set, conditional branch point 450 transfers control to block 452 to perform the read-locking function. This is permissible since simultaneous read-locks on a single data set do not cause a conflict. If it desires to write-lock the target data set, block 452 restores the task to the queue by resetting the pointer in field 46 of the enabled tasks TTL, and control is passed to block 454. The task is restored to the queue since a simultaneous read-lock and write-lock are not permitted. Indeed, this is exactly the problem sought to be avoided. This is the reason that branch 434–440 does not include a test for more entries in the queue of waiting tasks. If there are any, they will have to wait since a single write-lock on a target data set precludes any other locks. Similarly, branch 424–426 does not include a test for more entries in the queue since prior passes through branch 440–454 insure that the next such entry, if any, will be a request for a write-lock on the target data set.

It is to be understood that the above-described arrangement is only illustrative of the application of the principles of the present invention. Numerous other arrangements may be devised by those skilled in the art without departing from its spirit and scope. For example, the commercially available International Business Machines 9020, General Electric 645, and Univac 1108 multiprocessor systems can be programmed to make advantageous use of the present invention.

APPENDIX A

```
10 BEGIN INTEGER C1,C2,C3,C4,C
5,C6,C7,ENP,TASK,DS
  INTEGER ARRAY DSLT40,DSLT42,DSLT44,
    DSLT46,DSLT48[0:10],DSLT50,
    DSLT52,DSLT54[0:10,0:10],
    TLL10,TLL12,TLL14,TLL16,TLL18,TLL20,
    TLL22,TLL24,TLL26[0:20];
100 PROCEDURE LCKALL(TASK,ENP);
101 IF ENP=2 THEN GO TO B130;
102 IF TLL10[TASK]=1 THEN GO TO ERROR
ELSE
  TLL10[TASK]=1;
103 COMMENT LOCK THE TLL ENTRY;
104 GO TO B108;
106 ERROR: GO TO STOP;
108 B108:C1:=TLL42[TASK]:=TLL44[TASK];
109 COMMENT INITIALIZE THE COUNTER;
110 COMMENT PASS TASK NUMBER (TASK)
AND DATA
  SET POINTER (C1) TO LCKONE;
112 B112: LCKONE(TASK,C1);
114 IF TLL52[TASK]=1 THEN GO TO B120;
115 COMMENT CHECK TO SEE IF DATASET WAS
LOCKED;
116 B116: TLL40[TASK]=0;
117 COMMENT UNLOCK TLL HEADER AND
QUIT;
118 GO TO STOP;
120 B120: C1:=TLL42[TASK]:=C1-1;
122 If C1=0 THEN GO TO B116;
124 If C1<0 THEN GO TO ERROR;
126 GO TO B112;
130 B130: COMMENT ENTRY PT TWO LCKALL;
```

134 IF TLL40[TASK]=1 THEN GO TO ERROR ELSE
TLL40[TASK]=1;
135 C1:=TLL42[TASK]; GO TO B120;

APPENDIX A1

136 COMMENT ERROR HANDLING ALL TAKEN CARE OF BY B106.
TLL ENTRY IS LOCKED, COUNTER IS INITIALIZED;
200 B200: COMMENT START OF LCKONE CODE;
PROCEDURE LCKONE (TASK,C1);
202 C2:=20;
203 DS:=TLL54[TASK,C1];
204 B204;IF DSLT10[DS]=D THEN BEGIN;
DSLT10[DS]:=1;
205 GO TO B214;
206 COMMENT IT'S LOCKED SO TRY AGAIN;
208 C2:=C2−1;
210 IF C2<0 THEN GO TO ERROR/ELSE GO TO B204;
211 COMMENT SHOULDN'T BE LOCKED THAT LONG;
212 COMMENT ALL ERROR HANDLING IS AT ERROR;
214 IF TLL50[TASK,C1]=0 THEN GO TO B226;
215 COMMENT IF WRITE LOCK GO TO 226;
216 IF DSLT22[DS]=0 DSLT18[DS]/=0 THEN GO TO B224;
217 COMMENT CHECK FOR WRITE LOCK OR LOCK QUEUED;
218 DSLT24[DS]:=DSLT24[DS]+1;
219 COMMENT DUMP LOCK COUNTER;
220 B220:TLL52[C2]=1; DSLT10[TLL54[TASK,C1]]=D;
221 COMMENT: SET FLAGS;
222 GO TO B229;
224 B224 IF DSLT18[DS]=0 THEN DSLT18[18]:= TASK;
DSLT26[DS]:=TLL46[DSLT26[DS]]:=TASK; GO TO B220;
225 COMMENT QUEUE TASK;
226 B226; IF DSLT20[DS]=1 THEN GO TO B224;
227 COMMENT WRITE LOCK THE DS;
228 DSLT18[DS]:=TASK;DSLT22[DS]=0; TLL20[TASK]:=1;
229 COMMENT SET WRITE LOCK FLAGS
230 B229: END LCKONE;

APPENDIX A2

300 PROCEDURE UNLALL [TASK];
302 IF TLL40[TASK]=1 THEN GO TO ERROR
304 TLL40[TASK]1;
305 COMMENT LOCK TLL ENTRY;
306 COMMENT ALL ERRORS ARE HANDLED BY ERROR;
308 C3:=TLL44[TASK];
310 B310: COMMENT TEST TO SEE IF DS IS LOCKED;
312 IF TLL52[TASK,C3]=0 GO TO B316;
314 UNLONE [TASK,C3];
316 B316:C3:=C3−1;
318 IF C3=0 THEN GO TO B322;
319 COMMENT SEE IF ALL DS ARE UNLOCKED;
320 IF C3<0 THEN GO TO ERROR; GO TO B310;
322 B322: TLL40[TASK]:=0;
323 COMMENT SET UNLOCKED FLAG;
324 END UNLALL;
400 PROCEDURE UNLONE [TASK,C3];
402 C4:=20;
403 C5:=TLL54[TASK,C3]; COMMENT C5=DATA SET TO BE UNLOCKED
404 B404: IF DSLT10[C5]=1 THEN GO TO B408;
406 DSLT10[C5]:=1; GO TO B414;
408 C4:=C4−
409 COMMENT STILL LOCKED TRY AGAIN UNLESS C4≤O;
410 IF C4>0 THEN GO TO B404;
412 GO TO ERROR;
414 IF DSLT20[C5]=0 THEN GO TO ERROR;
415 COMMENT GO TO ERROR IF DS IS UNLOCKED
416 IF DSLT22[C5]=0 THEN GO TO B228;
417 COMMENT GO TO 228 IF WRITE LOCK;
418 DSLT24[C5]: = DSLT24[C5] − 1;
420 IF DSLT[24] = 0 THEN GO TO B228;

APPENDIX A3

421 COMMENT IF NO MORE READ LOCKS THEN GO TO 228;
422 IF DSLT[24]<0 THEN GO TO ERROR;
432 COMMENT IF NEGATIVE READ LOCKS THEN QUIT;
424 B424: DSLT10[C5]:=0;
425 COMMENT UNLOCK THE HEADER AND QUIT;
426 GO TO B456;
428 IF DSLT18[C5]=0 THEN GO TO B424;
COMMENT IF NO ONE IS WAITING QUIT;
429 C6:=TASK; COMMENT SAVE TASK POINTER FOR UNLOCKING;
430 TASK:=DSLT16[C5];
431 COMMENT GET WAITING TASK;
432 IF TLL 50[TASK]=1 THEN GO TO B442;
434 DSLT 24[C5]:=TASK; DSLT22[C5]:=0;
DSLT20[C5]:=1; TLL52 [TASK]:=1;
435 COMMENT SET DS WRITE LOCKED;
436 DSLT10[C5]0;
437 ENP=2;
438 LCKALL (TASK, ENP);
439 COMMENT TRY TO LOCK REST OF DATA SETS;
440 B440: GO TO B456;
442 B442: DSLT24[C5]:=DSLT24[C5]1; COMMENT BUMP READ COUNT
443 ENP:=2; COMMENT SET FLAG AND GO FOR REMAINING LOCKS;
444 LCKALL(TASK,ENP);
446 TASK:=DSLT18[C5]:=TLL46[DSLT18[C5]];
If DSLT18[C5]=0 THEN GO TO 440;
448 COMMENT IF NO MORE READ LOCKS QUIT;
450 IF TLL50[TASK]=1 THEN GO TO B442;
451 COMMENT IF NEXT TASK REQUIRED READ LOCK THEN B442;
452 COMMENT:DONE
453 TASK:=C6;

APPENDIX A4

454 DSLT10[C5]:=0; GO TO 440;
455 COMMENT UNLOCK HEARER;
456 B456: END UNLONE;
458 STOP END;

What is claimed is:

1. The machine method of preventing undesired simultaneous access to a single block of data by two or more processors in a task-oriented multiprocessor computing system comprising the machine steps of:
 locking each block of data used by a task immediately prior to the absolute enabling of said task; and
 unlocking each locked block of data that remains locked after the execution of said task.

2. The machine method of claim 1 wherein said step of locking further comprises the machine steps of:
 write-locking each block of data that said task can possibly modify during execution; and
 read-locking each block of data that said task can possibly access during execution.

3. The machine method of claim 1 wherein said step of locking further comprises the machine steps of:
 read-locking said block of data if said task will access it during its execution and if said block of data is not currently write-locked;
 write-locking said block of data if said task will modify it during its execution and if said block of data is currently neither read-locked nor write-locked; and
 placing a pointer to said task on a queue if said read-locking or said write-locking is not performed.

4. The method of claim 1 wherein said step of unlocking each said locked block of data further comprises the machine steps of:
 determining whether any other tasks currently require a read-lock on said locked block of data; and
 placing new read-locks upon said locked block of data in accordance with the requirements of said other tasks.

5. The machine method of claim 1 wherein said step of unlocking comprises performing the following machine steps for each particular locked block of data:
 1. determining whether any other tasks currently require a lock on said locked block of data;
 2. unlocking said locked block of data if no other task requires a lock on said locked block of data;
 3. choosing the first of said other tasks if there are other tasks requiring a lock on said locked block of data;
 4. determining whether said first task requires a read-lock or a write-lock to be placed upon said locked block of data;
 5. relocking said locked block of data in accordance with said first task requirement;
 6. terminating the unlocking of said locked block of data if step (5) resulted in placing a write-lock on said locked block of data or if no other task requires a lock on said locked block of data;
 7. choosing the next task from the remaining ones of said other tasks;
 8. determining whether said next task requires a read-lock or a write-lock to be placed upon said locked block of data;
 9. terminating the unlocking of said locked block of data if said next task requires a write-lock to be placed on said locked block of data;
 10. read-locking said locked block of data if said next task requires a read-lock to be placed on said locked block of data; and
 11. repeating steps (7) through (10) if there remain any other tasks requiring a lock on said locked block of data.

6. The machine method of executing a task in a task-oriented multiprocessor computer system comprising the machine steps of:
 executing all tasks that are precedent to said task;
 executing all input programs that are precedent to said task;
 executing all output programs that are precedent to said task;
 write-locking all blocks of data that said task can possibly modify during said task execution;
 read-locking all blocks of data that said task can possibly read during said task execution;
 enabling said task;
 detecting the completion of said task; and
 unlocking all said write-locked blocks of data and all said read-locked blocks of data upon said completion.

7. In a machine process for using predetermined precedence relationships for assigning tasks to processor units in a multiprocessor computing system, whereby each particular task is assigned to a particular processor as soon as said task's precedence requirements have been met, the improvement comprising the machine steps of:
 write-locking all blocks of data that a particular task will modify during execution immediately before said task is assigned to a processor unit;
 read-locking all blocks of data that a particular task will access during execution immediately before said task is assigned to a processor unit; and
 unlocking all said write-locked blocks of data and all said read-locked blocks of data that remain locked after said particular task has been executed.

* * * * *